| (12) | United States Patent | (10) Patent No.: | US 7,757,289 B2 |
|---|---|---|---|
| | Gruzman et al. | (45) Date of Patent: | Jul. 13, 2010 |

(54) SYSTEM AND METHOD FOR INSPECTING DYNAMICALLY GENERATED EXECUTABLE CODE

(75) Inventors: David Gruzman, Ramat Gan (IL); Yuval Ben-Itzhak, Tel Aviv (IL)

(73) Assignee: Finjan, Inc., San Jose, CA (US)

( * ) Notice: Subject to any disclaimer, the term of this patent is extended or adjusted under 35 U.S.C. 154(b) by 1247 days.

(21) Appl. No.: 11/298,475

(22) Filed: Dec. 12, 2005

(65) Prior Publication Data

US 2007/0136811 A1 Jun. 14, 2007

(51) Int. Cl.
*G06F 21/00* (2006.01)
(52) U.S. Cl. .............................. 726/24; 726/22; 713/188
(58) Field of Classification Search .................. 726/22, 726/24, 25
See application file for complete search history.

(56) References Cited

U.S. PATENT DOCUMENTS

| 5,359,659 | A | * | 10/1994 | Rosenthal ...................... 726/24 |
|---|---|---|---|---|
| 5,974,549 | A | * | 10/1999 | Golan ........................... 726/23 |
| 5,983,348 | A | | 11/1999 | Ji ................................. 726/13 |
| 6,092,194 | A | * | 7/2000 | Touboul ........................ 726/24 |
| 6,167,520 | A | | 12/2000 | Touboul ........................ 726/23 |
| 6,272,641 | B1 | | 8/2001 | Ji ................................. 726/24 |
| 6,934,857 | B1 | | 8/2005 | Bartleson et al. ................. 726/5 |
| 6,965,968 | B1 | | 11/2005 | Touboul ........................ 711/118 |
| 7,203,934 | B2 | * | 4/2007 | Souloglou et al. ............ 717/146 |
| 7,287,279 | B2 | * | 10/2007 | Bertman et al. ................ 726/23 |
| 7,313,822 | B2 | * | 12/2007 | Ben-Itzhak .................... 726/24 |
| 2002/0116635 | A1 | * | 8/2002 | Sheymov ...................... 713/200 |
| 2004/0133796 | A1 | * | 7/2004 | Cohen et al. .................. 713/200 |
| 2004/0153644 | A1 | * | 8/2004 | McCorkendale et al. .... 713/156 |
| 2004/0158729 | A1 | | 8/2004 | Szor ............................. 713/190 |
| 2005/0108562 | A1 | * | 5/2005 | Khazan et al. ................ 713/200 |

(Continued)

OTHER PUBLICATIONS

Web printout from http://www.finjan.com/Content.aspx?id=1456, printed on Sep. 10, 2009, 6 pages.*

(Continued)

*Primary Examiner*—Ponnoreay Pich
(74) *Attorney, Agent, or Firm*—King & Spalding LLP (57) ABSTRACT

A method for protecting a client computer from dynamically generated malicious content, including receiving at a gateway computer content being sent to a client computer for processing, the content including a call to an original function, and the call including an input, modifying the content at the gateway computer, including replacing the call to the original function with a corresponding call to a substitute function, the substitute function being operational to send the input to a security computer for inspection, transmitting the modified content from the gateway computer to the client computer, processing the modified content at the client computer, transmitting the input to the security computer for inspection when the substitute function is invoked, determining at the security computer whether it is safe for the client computer to invoke the original function with the input, transmitting an indicator of whether it is safe for the client computer to invoke the original function with the input, from the security computer to the client computer, and invoking the original function at the client computer with the input, only if the indicator received from the security computer indicates that such invocation is safe. A system and a computer-readable storage medium are also described and claimed.

46 Claims, 5 Drawing Sheets

U.S. PATENT DOCUMENTS

2006/0015940 A1    1/2006    Zamir et al. .................. 726/22
2006/0161981 A1*  7/2006    Sheth et al. ................... 726/22
2007/0016948 A1*  1/2007    Dubrovsky et al. ........... 726/22

OTHER PUBLICATIONS

Web printout from http://www.finjan.com/secure_web_gateway.aspx, printed on Sep. 10, 2009, 7 pages.*

Mark LaDue, "Hostile Applets Home Page", 6 pages, printed Sep. 10, 2009.*

Mark LaDue, "The Rube Goldberg Approach to Java Security", 1998, 9 pages.*

Mark LaDue, "Drowning in the Surf: A Review of Finjan Software's SurfinShield 2.0", 1997, 6 pages.*

Mark LaDue, "With Trousers Down and Duke Exposed: How Finjan Software Handles Criticism", 1997, 5 pages.*

Huang et al, "Web Application Security Assessment by Fault Injection and Behavior Monitoring", ACM, 2003, 12 pages.*

"Vital Security Web Applicance", unknown author, unknown date, 7 pages.*

International Search Report and Written Opinion for Application No. PCT/IL06/01430, dated Jul. 17, 2008, 9 pp.

* cited by examiner

SYSTEM AND METHOD FOR INSPECTING DYNAMICALLY GENERATED EXECUTABLE CODE

FIELD OF THE INVENTION

The present invention relates to computer security, and more particularly to protection against malicious code such as computer viruses.

BACKGROUND OF THE INVENTION

Computer viruses have been rampant for over two decades now. Computer viruses generally come in the form of executable code that performs adverse operations, such as modifying a computer's operating system or file system, damaging a computer's hardware or hardware interfaces, or automatically transmitting data from one computer to another. Generally, computer viruses are generated by hackers willfully, in order to exploit computer vulnerabilities. However, viruses can also arise by accident due to bugs in software applications.

Originally computer viruses were transmitted as executable code inserted into files. As each new viruses was discovered, a signature of the virus was collected by anti-virus companies and used from then on to detect the virus and protect computers against it. Users began routinely scanning their file systems using anti-virus software, which regularly updated its signature database as each new virus was discovered.

Such anti-virus protection is referred to as "reactive", since it can only protect in reaction to viruses that have already been discovered.

With the advent of the Internet and the ability to run executable code such as scripts within Internet browsers, a new type of virus formed; namely, a virus that enters a computer over the Internet and not through the computer's file system. Such Internet viruses can be embedded within web pages and other web content, and begin executing within an Internet browser as soon as they enter a computer. Routine file scans are not able to detect such viruses, and as a result more sophisticated anti-virus tools had to be developed.

Two generic types of anti-virus applications that are currently available to protect against such Internet viruses are (i) gateway security applications, and (ii) desktop security applications. Gateway security applications shield web content before the content is delivered to its intended destination computer. Gateway security applications scan web content, and block the content from reaching the destination computer if the content is deemed by the security application to be potentially malicious. In distinction, desktop security applications shield against web content after the content reaches its intended destination computer.

Moreover, in addition to reactive anti-virus applications, that are based on databases of known virus signatures, recently "proactive" anti-virus applications have been developed. Proactive anti-virus protection uses a methodology known as "behavioral analysis" to analyze computer content for the presence of viruses. Behavior analysis is used to automatically scan and parse executable content, in order to detect which computer operations the content may perform. As such, behavioral analysis can block viruses that have not been previously detected and which do not have a signature on record, hence the name "proactive".

Assignee's U.S. Pat. No. 6,092,194 entitled SYSTEM AND METHOD FOR PROTECTING A COMPUTER AND A NETWORK FROM HOSTILE DOWNLOADABLES, the contents of which are hereby incorporated by reference, describes gateway level behavioral analysis. Such behavioral analysis scans and parses content received at a gateway and generates a security profile for the content. A security profile is a general list or delineation of suspicious, or potentially malicious, operations that executable content may perform. The derived security profile is then compared with a security policy for the computer being protected, to determine whether or not the content's security profile violates the computer's security policy. A security policy is a general set of simple or complex rules, that may be applied logically in series or in parallel, which determine whether or not a specific operation is permitted or forbidden to be performed by the content on the computer being protected. Security policies are generally configurable, and set by an administrator of the computer that is being protected.

Assignee's U.S. Pat. No. 6,167,520 entitled SYSTEM AND METHOD FOR PROTECTING A CLIENT DURING RUNTIME FROM HOSTILE DOWNLOADABLES, the contents of which are hereby incorporated by reference, describes desktop level behavioral analysis. Desktop level behavioral analysis is generally implemented during runtime, while a computer's web browser is processing web content received over the Internet. As the content is being processed, desktop security applications monitor calls made to critical systems of the computer, such as the operating system, the file system and the network system. Desktop security applications use hooks to intercept calls made to operating system functions, and allow or block the calls as appropriate, based on the computer's security policy.

Each of the various anti-virus technologies, gateway vs. desktop, reactive vs. proactive, has its pros and cons. Reactive anti-virus protection is computationally simple and fast; proactive virus protection is computationally intensive and slower. Reactive anti-virus protection cannot protect against new "first-time" viruses, and cannot protect a user if his signature file is out of date; proactive anti-virus protection can protect against new "first-time" viruses and do not require regular downloading of updated signature files. Gateway level protection keeps computer viruses at a greater distance from a local network of computers; desktop level protection is more accurate. Desktop level protection is generally available in the consumer market for hackers to obtain, and is susceptible to reverse engineering; gateway level protection is not generally available to hackers.

Figure 1:
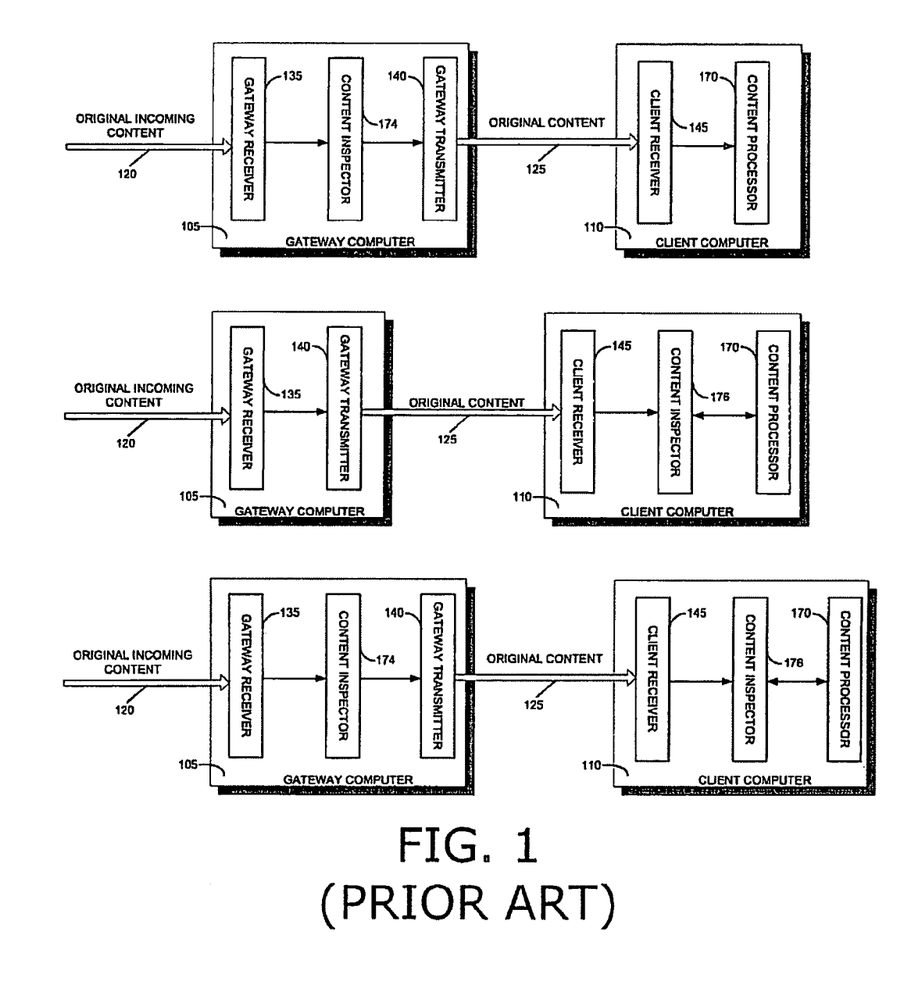
FIG. 1 is a simplified block diagram of prior art systems for blocking malicious content.

Reference is now made to FIG. 1, which is a simplified block diagram of prior art systems for blocking malicious content, as described hereinabove. The topmost system shown in FIG. 1 illustrates a gateway level security application. The middle system shown in FIG. 1 illustrates a desktop level security application, and the bottom system shown in FIG. 1 illustrates a combined gateway+desktop level security application.

The topmost system shown in FIG. 1 includes a gateway computer 105 that receives content from the Internet, the content intended for delivery to a client computer 110. Gateway computer 105 receives the content over a communication channel 120, and gateway computer communicates with client computer 110 over a communication channel 125. Gateway computer 105 includes a gateway receiver 135 and a gateway transmitter 140. Client computer 110 includes a client receiver 145. Client computer generally also has a client transmitter, which is not shown.

Client computer 110 includes a content processor 170, such as a conventional web browser, which processes Internet content and renders it for interactive viewing on a display monitor. Such Internet content may be in the form of executable code, JavaScript, VBScript, Java applets, ActiveX controls, which are supported by web browsers.

Gateway computer 105 includes a content inspector 174 which may be reactive or proactive, or a combination of reactive and proactive. Incoming content is analyzed by content inspector 174 before being transmitted to client computer 110. If incoming content is deemed to be malicious, then gateway computer 105 preferably prevents the content from reaching client computer 110. Alternatively, gateway computer 105 may modify the content so as to render it harmless, and subsequently transmit the modified content to client computer 110.

Content inspector 174 can be used to inspect incoming content, on its way to client computer 110 as its destination, and also to inspect outgoing content, being sent from client computer 110 as its origin.

The middle system shown in FIG. 1 includes a gateway computer 105 and a client computer 110, the client computer 110 including a content inspector 176. Content inspector 176 may be a conventional signature-based anti-virus application, or a run-time behavioral based application that monitors run-time calls invoked by content processor 170 to operating system, file system and network system functions.

The bottom system shown in FIG. 1 includes both a content inspector 174 at gateway computer 105, and a content inspector 176 at client computer 110. Such a system can support conventional gateway level protection, desktop level protection, reactive anti-virus protection and proactive anti-virus protection.

As the hacker vs. anti-virus protection battle continues to wage, a newer type of virus has sprung forward; namely, dynamically generated viruses. These viruses are themselves generated only at run-time, thus thwarting conventional reactive analysis and conventional gateway level proactive behavioral analysis. These viruses take advantage of features of dynamic HTML generation, such as executable code or scripts that are embedded within HTML pages, to generate themselves on the fly at run-time.

For example, consider the following portion of a standard HTML page:

```
<!DOCTYPE HTML PUBLIC "-//W3C//DTD HTML 4.0
Transitional//EN">
<HTML>
<SCRIPT LANGUAGE="JavaScript">
...
document.write("<h1>text that is generated at run-time</h1>");
...
</SCRIPT>
<BODY>
...
</BODY>
</HTML>
```

The text within the <SCRIPT> tags is JavaScript, and includes a call to the standard function document.write( ), which generates dynamic HTML. In the example above, the function document.write( ) is used to generate HTML header text, with a text string that is generated at run-time. If the text string generated at run-time is of the form <SCRIPT>malicious JavaScript</SCRIPT> then the document.write( ) function will insert malicious JavaScript into the HTML page that is currently being rendered by a web browser. In turn, when the web browser processes the inserted text, it will perform malicious operations to the client computer.

Such dynamically generated malicious code cannot be detected by conventional reactive content inspection and conventional gateway level behavioral analysis content inspection, since the malicious JavaScript is not present in the content prior to run-time. A content inspector will only detect the presence of a call to Document.write( ) with input text that is yet unknown. If such a content inspector were to block all calls to Document.write( ) indiscriminately, then many harmless scripts will be blocked, since most of the time calls to Document.write( ) are made for dynamic display purposes only.

U.S. Pat. Nos. 5,983,348 and 6,272,641, both to Ji, describe reactive client level content inspection, that modifies downloaded executable code within a desktop level anti-virus application. However, such inspection can only protect against static malicious content, and cannot protect against dynamically generated malicious content.

Desktop level run-time behavioral analysis has a chance of shielding a client computer against dynamically generated malicious code, since such code will ultimately make a call to an operating system function. However, desktop anti-virus protection has a disadvantage of being widely available to the hacker community, which is always eager to find vulnerabilities. In addition, desktop anti-virus protection has a disadvantage of requiring installation of client software.

As such, there is a need for a new form of behavioral analysis, which can shield computers from dynamically generated malicious code without running on the computer itself that is being shielded.

SUMMARY OF THE DESCRIPTION

The present invention concerns systems and methods for implementing new behavioral analysis technology. The new behavioral analysis technology affords protection against dynamically generated malicious code, in addition to conventional computer viruses that are statically generated.

The present invention operates through a security computer that is preferably remote from a client computer that is being shielded while processing network content. During run-time, while processing the network content, but before the client computer invokes a function call that may potentially dynamically generate malicious code, the client computer passes the input to the function to the security computer for inspection, and suspends processing the network content pending a reply back from the security computer. Since the input to the function is being passed at run-time, it has already been dynamically generated and is thus readily inspected by a content inspector. Referring to the example above, were the input to be passed to the security computer prior to run-time, it would take the form of indeterminate text; whereas the input passed during run-time takes the determinate form <SCRIPT>malicious JavaScript</SCRIPT> which can readily be inspected. Upon receipt of a reply from the security computer, the client computer resumes processing the network content, and knows whether to by-pass the function call invocation.

To enable the client computer to pass function inputs to the security computer and suspend processing of content pending replies from the security computer, the present invention operates by replacing original function calls with substitute function calls within the content, at a gateway computer, prior to the content being received at the client computer.

The present invention also provides protection against arbitrarily many recursive levels of dynamic generation of malicious code, whereby such code is generated via a series of successive function calls, one within the next.

By operating through the medium of a security computer, the present invention overcomes the disadvantages of desktop anti-virus applications, which are available to the hacker community for exploit. Security applications embodying the present invention are concealed securely within managed computers.

There is thus provided in accordance with a preferred embodiment of the present invention a method for protecting a client computer from dynamically generated malicious content, including receiving at a gateway computer content being sent to a client computer for processing, the content including a call to an original function, and the call including an input, modifying the content at the gateway computer, including replacing the call to the original function with a corresponding call to a substitute function, the substitute function being operational to send the input to a security computer for inspection, transmitting the modified content from the gateway computer to the client computer, processing the modified content at the client computer, transmitting the input to the security computer for inspection when the substitute function is invoked, determining at the security computer whether it is safe for the client computer to invoke the original function with the input, transmitting an indicator of whether it is safe for the client computer to invoke the original function with the input, from the security computer to the client computer, and invoking the original function at the client computer with the input, only if the indicator received from the security computer indicates that such invocation is safe.

There is further provided in accordance with a preferred embodiment of the present invention a system for protecting a client computer from dynamically generated malicious content, including a gateway computer, including a gateway receiver for receiving content being sent to a client computer for processing, the content including a call to an original function, and the call including an input, a content modifier for modifying the received content by replacing the call to the original function with a corresponding call to a substitute function, the substitute function being operational to send the input to a security computer for inspection, and a gateway transmitter for transmitting the modified content from the gateway computer to the client computer, a security computer, including a security receiver for receiving the input from the client computer, an input inspector for determining whether it is safe for the client computer to invoke the original function with the input, and a security transmitter for transmitting an indicator of the determining to the client computer, and a client computer communicating with the gateway computer and with the security computer, including a client receiver for receiving the modified content from the gateway computer, and for receiving the indicator from the security computer, a content processor for processing the modified content, and for invoking the original function only if the indicator indicates that such invocation is safe; and a client transmitter for transmitting the input to the security computer for inspection, when the substitute function is invoked.

There is yet further provided in accordance with a preferred embodiment of the present invention a computer-readable storage medium storing program code for causing at least one computing device to receive content including a call to an original function, and the call including an input, replace the call to the original function with a corresponding call to a substitute function, the substitute function being operational to send the input for inspection, thereby generating modified content, process the modified content, transmit the input for inspection, when the substitute function is invoked while processing the modified content, and suspend processing of the modified content, determine whether it is safe to invoke the original function with the input, transmit an indicator of whether it is safe for a computer to invoke the original function with the input, and resume processing of the modified content after receiving the indicator, and invoke the original function with the input only if the indicator indicates that such invocation is safe.

There is additionally provided in accordance with a preferred embodiment of the present invention a method for protecting a client computer from dynamically generated malicious content, including receiving content being sent to a client computer for processing, the content including a call to an original function, and the call including an input, modifying the content, including replacing the call to the original function with a corresponding call to a substitute function, the substitute function being operational to send the input to a security computer for inspection, and transmitting the modified content to the client computer for processing.

There is moreover provided in accordance with a preferred embodiment of the present invention a system for protecting a client computer from dynamically generated malicious content, including a receiver for receiving content being sent to a client computer for processing, the content including a call to an original function, and the call including an input, a content modifier for modifying the received content by replacing the call to the original function with a corresponding call to a substitute function, the substitute function being operational to send the input to a security computer for inspection, and a transmitter for transmitting the modified content to the client computer.

There is further provided in accordance with a preferred embodiment of the present invention a computer-readable storage medium storing program code for causing a computing device to receive content including a call to an original function, and the call including an input, and replace the call to the original function with a corresponding call to a substitute function, the substitute function being operational to send the input for inspection.

There is yet further provided in accordance with a preferred embodiment of the present invention a method for protecting a client computer from dynamically generated malicious content, including receiving content being sent to a client computer for processing, the content including a call to an original function, and the call including an input, modifying the content, including replacing the call to the original function with a corresponding call to a substitute function, the substitute function being operational to send the input for inspection, transmitting the modified content to the client computer for processing, receiving the input from the client computer, determining whether it is safe for the client computer to invoke the original function with the input, and transmitting to the client computer an indicator of whether it is safe for the client computer to invoke the original function with the input.

There is additionally provided in accordance with a preferred embodiment of the present invention a system for protecting a client computer from dynamically generated malicious content, including a receiver (i) for receiving content being sent to a client computer for processing, the content including a call to an original function, and the call including an input, and (ii) for receiving the input from the client computer, a content modifier for modifying the received content by replacing the call to the original function with a corresponding call to a substitute function, the substitute function being operational to send the input for inspection, an input inspector for determining whether it is safe for the client computer to invoke the original function with the input, and a transmitter (i) for transmitting the modified content to the client computer, and (ii) for transmitting an indicator of the determining to the client computer.

There is moreover provided in accordance with a preferred embodiment of the present invention a computer-readable storage medium storing program code for causing a computing device to receive content including a call to an original function, and the call including an input, replace the call to the original function with a corresponding call to a substitute function, the substitute function being operational to send the input for inspection, and determine whether it is safe for a computer to invoke the original function with the input.

There is further provided in accordance with a preferred embodiment of the present invention a method for protecting a computer from dynamically generated malicious content, including processing content received over a network, the content including a call to a first function, and the call including an input, transmitting the input to a security computer for inspection, when the first function is invoked, receiving from the security computer an indicator of whether it is safe to invoke a second function with the input, and invoking the second function with the input, only if the indicator indicates that such invocation is safe.

There is yet further provided in accordance with a preferred embodiment of the present invention a system for protecting a computer from dynamically generated malicious content, including a content processor (i) for processing content received over a network, the content including a call to a first function, and the call including an input, and (ii) for invoking a second function with the input, only if a security computer indicates that such invocation is safe, a transmitter for transmitting the input to the security computer for inspection, when the first function is invoked, and a receiver for receiving an indicator from the security computer whether it is safe to invoke the second function with the input.

There is additionally provided in accordance with a preferred embodiment of the present invention a computer-readable storage medium storing program code for causing a computing device to process content received over a network, the content including a call to a first function, and the call including an input, transmit the input for inspection, when the first function is invoked, and suspend processing of the content, receive an indicator of whether it is safe to invoke a second function with the input, and resume processing of the content after receiving the indicator, and invoke the second function with the input only if the indicator indicates that such invocation is safe.

There is moreover provided in accordance with a preferred embodiment of the present invention a method for protecting a client computer from dynamically generated malicious content, including receiving an input from a client computer, determining whether it is safe for the client computer to invoke a function with the input, and transmitting an indicator of the determining to the client computer.

There is further provided in accordance with a preferred embodiment of the present invention a system for protecting a client computer from dynamically generated malicious content, including a receiver for receiving an input from a client computer, an input inspector for determining whether it is safe for the client computer to invoke a function with the input, and a transmitter for transmitting an indicator of the determining to the client computer.

There is further provided in accordance with a preferred embodiment of the present invention a computer-readable storage medium storing program code for causing a computing device to receive an input from a computer, determine whether it is safe for the computer to invoke a function with the input, and transmit an indicator of the determination to the computer.

The following definitions are employed throughout the specification and claims.

SECURITY POLICY—a set of one or more rules that determine whether or not a requested operation is permitted. A security policy may be explicitly configurable by a computer system administrator, or may be implicitly determined by application defaults.

SECURITY PROFILE—information describing one or more suspicious operations performed by executable software.

BRIEF DESCRIPTION OF THE DRAWINGS

The present invention will be more fully understood and appreciated from the following detailed description, taken in conjunction with the drawings in which.

DETAILED DESCRIPTION

The present invention concerns systems and methods for protecting computers against dynamically generated malicious code.

Figure 2:
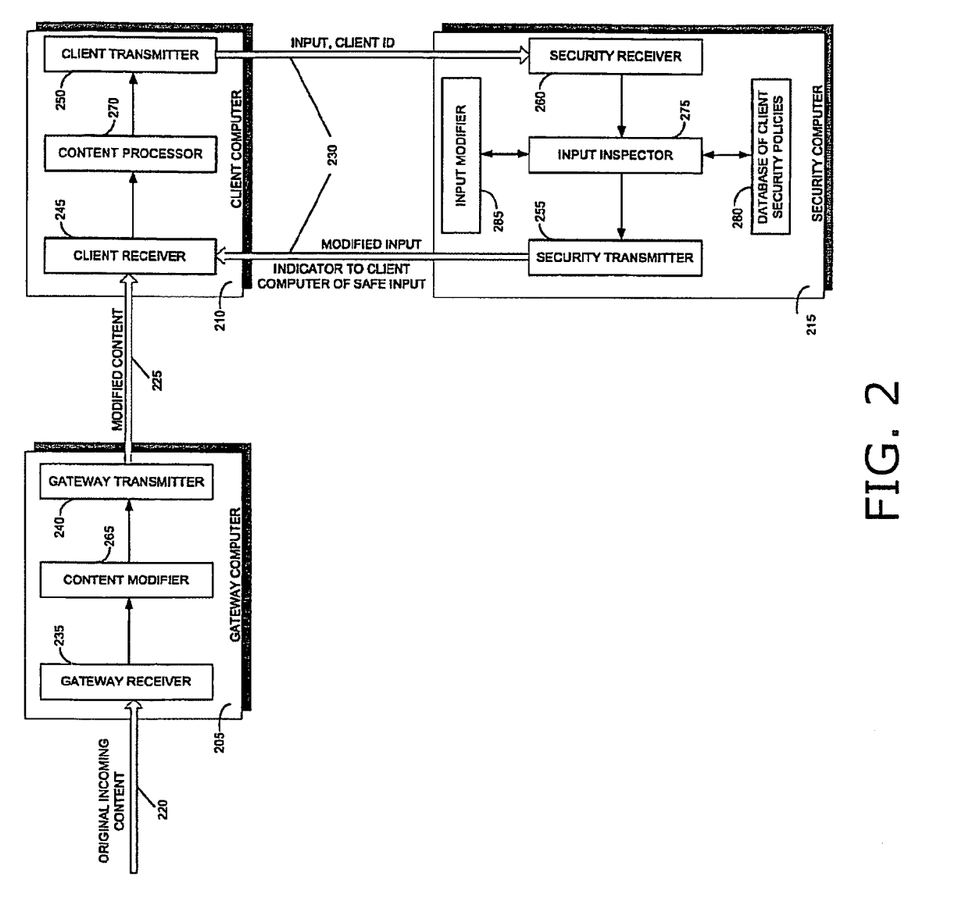
FIG. 2 is a simplified block diagram of a system for protecting a computer from dynamically generated malicious executable code, in accordance with a preferred embodiment of the present invention.

Reference is now made to FIG. 2, which is a simplified block diagram of a system for protecting a computer from dynamically generated malicious executable code, in accordance with a preferred embodiment of the present invention. Three major components of the system are a gateway computer 205, a client computer 210, and a security computer 215. Gateway computer 205 receives content from a network, such as the Internet, over a communication channel 220. Such content may be in the form of HTML pages, XML documents, Java applets and other such web content that is generally rendered by a web browser. Client computer 210 communicates with gateway computer 205 over a communication channel 225, and communicates with security computer 215 over a communication channel 230. Gateway computer 205 receives data at a gateway receiver 235, and transmits data at gateway transmitter 240. Similarly, client computer 210 receives data at client receiver 245, and transmits data at client transmitter 250; and security computer 215 receives data at security receiver 260 and transmits data at security transmitter 265.

It will be appreciated by those skilled in the art that the network topology of FIG. 2 is shown as a simple topology, for purposes of clarity of exposition. However, the present invention applies to general architectures including a plurality of client computers 210 that are serviced by one or more gateway computers 205, and by one or more security computers 215. Similarly, communication channels 220, 225 and 230 may each be multiple channels using standard communication protocols such as TCP/IP.

Figure 4:
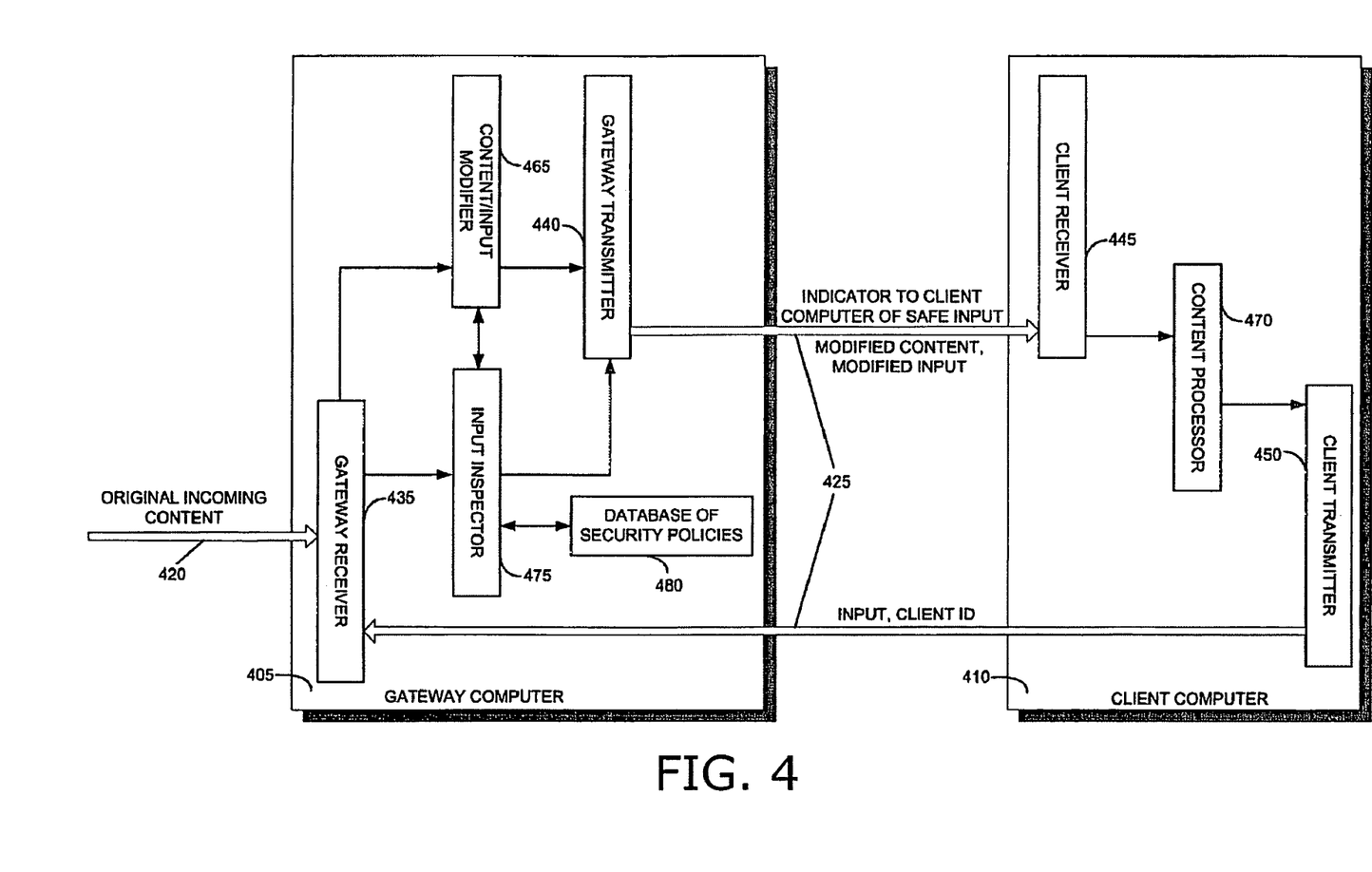
FIG. 4 is a simplified block diagram of a system for protecting a computer from dynamically generated malicious executable code, in which the gateway computer itself performs the code inspection, in accordance with a preferred embodiment of the present invention.

Moreover, the functionality of security computer 215 may be included within gateway computer 205. Such a topology is illustrated in FIG. 4.

The computers shown in FIG. 2 also include additional processing modules, each of which is described in detail hereinbelow. Gateway computer 205 includes a content modifier 265, client computer 210 includes a content processor 270, and security computer 215 includes an inspector 275, a database of client security policies 280, and an input modifier 285.

Content modifier 265 preferably modifies original content received by gateway computer 205, and produces modified content, which includes a layer of protection to combat dynamically generated malicious code. Specifically, content modifier 265 scans the original content and identifies function calls of the form Function(input).             (1)

Content modifier 265 further modifies selected ones of the function calls (1) to corresponding function calls Substitute_function(input,*),             (2)

whereby the call to Function( ) has been replaced with a call to Substitute_function( ). It is noted that the input intended for the original function is also passed to the substitute function, along with possible additional input denoted by "*".

It will be appreciated by those skilled in the art that content modifier 265 may modify all detected function calls, or only a portion of the detected function calls. Functions that are known to be safe, regardless of their inputs, need not be modified by content modifier 265. Similarly, functions that are not passed any inputs when invoked and are known to be safe, also need not be modified by content modifier 265.

Preferably, when call (2) is made, the substitute function sends the input to security computer 215 for inspection. Preferably, content modifier 265 also inserts program code for the substitute function into the content, or a link to the substitute function. Such a substitute function may be of the following general form shown in TABLE I.

TABLE I

Generic substitute function

```
Function Substitute_function(input)
{
        inspection_result = Call_security_computer_to_inspect(
                input, ID_of_client_computer);
        if (inspection_result)
                Original_function(input)
        else
                //do nothing
}
```

Preferably, the above function call_security_computer_to_inspect( ) passes the input intended for the original function to security computer 215 for inspection by inspector 275. In addition, an ID of client computer 210 is also passed to security computer 215. For example, the ID may correspond to a network address of client computer 210. When security computer 215 services many such client computers 210 at once, it uses the IDs to determine where to return each of its many results.

Optionally, the substitute function may pass additional parameters to security computer 215, such as the name of the original function, or security policy information as described hereinbelow with reference to database 280.

The function call_security_computer_to_inspect( ) preferably returns an indicator, inspection_result, of whether it is safe for client computer 210 to invoke the original function call (1). The indicator may be a Boolean variable, or a variable with more than two settings that can carry additional safety inspection information. In addition, as described hereinbelow with reference to input modifier 285, the function call_security_computer_to_inspect( ) may modify the input, and return to client computer 210 modified input to be used when invoking the original function call (1), instead of the original input. Use of input modifier 285 protects client computer 210 against recursively generated malicious code whereby the input itself to a first function generates a call to a second function.

For example, suppose a portion of the original content is of the form shown in TABLE II.

TABLE II

Example original content

```
<!DOCTYPE HTML PUBLIC "-//w3c//DTD HTML 4.0
Transitional//EN">
<HTML>
<SCRIPT LANGUAGE="JavaScript"
<!
...
Document.write("<h1>hello</h1>");
...
</SCRIPT>
<BODY>
...
</BODY>
</HTML>
```

Preferably, content modifier 265 alters the original content in TABLE II to the modified form shown in TABLE III. Specifically, content modifier 265 substitutes the call to the standard function Document.write( ), with a call to the substitute function Substitute_document.write( ), and inserts the function definition for the substitute function into the content. The standard function Document.write( ) generally writes lines of HTML and inserts them into the HTML page currently being processed by a client web browser.

TABLE III

Example modified content

```
<!DOCTYPE HTML PUBLIC "-//w3c//DTD HTML 4.0
Transitional//EN">
<HTML>
<SCRIPT LANGUAGE="JavaScript"
<!
...
Function Substitute_document.write(text)
{
        inspection_result = Call_security_computer_to_inspect(text);
        if inspection_result
                Document.write(text)
```

TABLE III-continued

Example modified content

```
    Else
        //do nothing
}
Substitute_document.write("<h1>hello</h1>");
...
</SCRIPT>
<BODY>
...
</BODY>
</HTML>
```

Content processor 270 processes the modified content generated by content modifier 265. Content processor may be a web browser running on client computer 210. When content processor invokes the substitute function call (2), the input is passed to security computer 215 for inspection. Processing of the modified content is then suspended until security computer 215 returns its inspection results to client computer 210. Upon receiving the inspection results, client computer 210 resumes processing the modified content. If inspection_result is true, then client computer 210 invokes the original function call (1); otherwise, client computer 210 does not invoke the original function call (1).

Security computer 215 may also modify the input that is passed to it by the substitute function. In such case, client computer 210 invokes the original function with such modified input, instead of the original input, after receiving the inspection results.

Input inspector 275 analyzes the input passed to security computer 215 by client computer 210; specifically, the input passed when client computer 210 invokes the function call (2). Generally, input inspector 275 scans the input to determine the potentially malicious operations that it may perform, referred to as the input's "security profile". Such potentially malicious operations can include inter alia operating system level commands, file system level commands, network level commands, application level commands, certain URLs with hyperlinks, and applets already known to be malicious. Security profiles are described in assignee's U.S. Pat. No. 6,092,194 entitled SYSTEM AND METHOD FOR PROTECTING A COMPUTER AND A NETWORK FROM HOSTILE DOWNLOADABLES, the contents of which are hereby incorporated by reference. Security profiles encompass access control lists, trusted/un-trusted certificates, trusted/un-trusted URLs, and trusted/un-trusted content.

After determining a security profile for the input, inspector 275 preferably retrieves information about permission settings for client computer 210, referred to as client computer's "security policy". Such permission settings are generally set by an administrator of client computer 210, and determine which commands are permitted to be performed by content processor 270 while processing content, and which commands are not permitted. Security policies are also described in assignee's U.S. Pat. No. 6,092,194. Security policies are flexible, and are generally set by an administrator of client computer 210. Preferably, security computer 215 has accesses to a database 280 of security profile information for a plurality of client computers. Database 280 may reside on security computer 215, or on a different computer.

By comparing the input's security profile to client computer 210's security policy, input inspector 275 determines whether it is safe for client computer 210 to make the function call (1). Security computer 215 sends back to client computer 210 an indicator, inspection_result, of the inspector's determination. Comparison of a security profile to a security policy is also described in assignee's U.S. Pat. No. 6,092,194. Security policies may include simple or complex logical tests for making a determination of whether or not an input is safe.

For example, suppose the content is an HTML page, and the function call (1) is the following JavaScript:

$$\text{Document.write("<h1><SCRIPT>Some JavaScript</SCRIPT></h1>").} \quad (3)$$

Such a function call serves to instruct content processor 270 to insert the text between the <h1> header tags into the HTML pages; namely the text <SCRIPT>JavaScript</SCRIPT> which itself invokes the JavaScript between the <SCRIPT> tags. It is noted that the function call (1) uses a function Document.write( ) that is normally considered to be safe. Indeed, the function Document.write( ) does not access client computer 210's operating system or file system and does not send or receive data outside of client computer 210. Moreover, the input in the call (3) to Document.write( ) may itself be dynamically generated, and not available for inspection prior to processing the HTML page. That is, the call may be of the form $$\text{Document.write("content that is dynamically generated at run-time"),}$$

where input to Document.write( ) may be in the form of a text string that itself is dynamically generated at run-time. Generally, such a function call cannot be analyzed successfully by behavioral based anti-virus software prior to run-time.

However, when input inspector 275 receives the input from client computer during run-time, after client computer has invoked the substitute call (2), the input has already been dynamically generated by content processor 270 and can thus be readily analyzed. Referring to the example above, when client computer 210 invokes the substitute call (2), it passes the input string $$\text{"<h1><SCRIPT>JavaScript</SCRIPT></h1>"} \quad (4)$$

to security computer 215. This string is then analyzed by input inspector 275, which recognizes the JavaScript and scans the JavaScript to determine any potentially malicious operations it includes. If potentially malicious operations are detected, and if they violate client computer 210's security policy, then inspector 275 preferably sets inspection_result to false. Otherwise, inspector 275 preferably sets inspection_result to true.

It may thus be appreciated by those skilled in the art that input inspector 275 is able to detect malicious code that is generated at run-time.

Malicious code may be generated within further recursive levels of function calls. For example, instead of the function call (3), which invokes a single function to dynamically generate JavaScript, two levels of function calls may be used. Consider, for example, the recursive function call $$\text{Document.write("<h1>Document.write(} \quad (5)$$
$$\text{"<h1><SCRIPT>Some JavaScript</SCRIPT></h1>")</h1>")} .$$

Such a function call first calls Document.write( ) to generate the function call (3), and then calls Document.write( ) again to generate the JavaScript. If the inputs to each of the Document.write( ) invocations in (5) are themselves dynamically generated at run-time, then one pass through input inspector may not detect the JavaScript.

To this end, input inspector 275 preferably passes inputs it receives to input modifier 285, prior to scanning the input. Input modifier preferably operates similar to content modifier 265, and replaces function calls detected in the input with corresponding substitute function calls. Referring to the example above, when client computer 210 invokes the outer call to Document.write( ) in (5), the input text string "<h1>Document.write(                                                      (6)
"<h1>SCRIPT>Some JavaScript</SCRIPT></h1>")</h1>"

is passed to security computer 215. Input modifier 285 detects the inner function call to Document.write( ) and replaces it with a corresponding substitute function call of the form (2). Input inspector 275 then inspects the modified input. At this stage, if the input to the inner call to Document.write( ) has not yet been dynamically generated, input inspector 275 may not detect the presence of the JavaScript, and thus may not set inspection_result to false if the JavaScript is malicious. However, security computer 215 returns the modified input to client computer 210. As such, when content processor 270 resumes processing, it adds the modified input into the HTML page. This guarantees that when content processor 270 begins to process the modified input, it will again invoke the substitute function for Document.write( ), which in turn passes the input of the inner Document.write( ) call of (5) to security computer 215 for inspection. This time around input inspector 275 is able to detect the presence of the JavaScript, and can analyze it accordingly.

It may thus be appreciated by those skilled in the art that when input modifier 285 supplements input inspector 275, inspector 275 has sufficient logic to be able to detect malicious code that is generated recursively at run-time.

In addition to inspecting inputs, security computer 215 preferably maintains an event log of potential security breaches. When input inspector 275 determines that an input is not safe, security computer 215 enters information about the input and client computer 210 into a log that is available for review by an administrator of client computer 210.

In accordance with a preferred embodiment of the present invention, it is anticipated that many client computers 210 use the same security computer 215 for protection. Each client computer may independently send inputs to security computer 215 for inspection. Security computer 215 may use cache memory to save results of inspection, so as to obviate the need to analyze the same input more than once. Use of cache memory when working with a plurality of security policies is described in assignee's U.S. Pat. No. 6,965,968 entitled POLICY-BASED CACHING.

Similarly, it is anticipated that gateway computer 205 services many client computers 210. Gateway computer may include its own content inspector, which is useful for detecting malicious content that is not dynamically generated, as described in assignee's U.S. Pat. No. 6,092,194.

It may be appreciated that substitute functions as in TABLE I may also pass the name of the original function to the security computer. That is, the call to Call_security_computer_to_inspect( ) may also pass a variable, say name_of_function, so that input inspector 275 can determine whether it is safe to invoke the specific original function with the input. In this way, input inspector 275 can distinguish between different functions with the same input.

Figure 3:
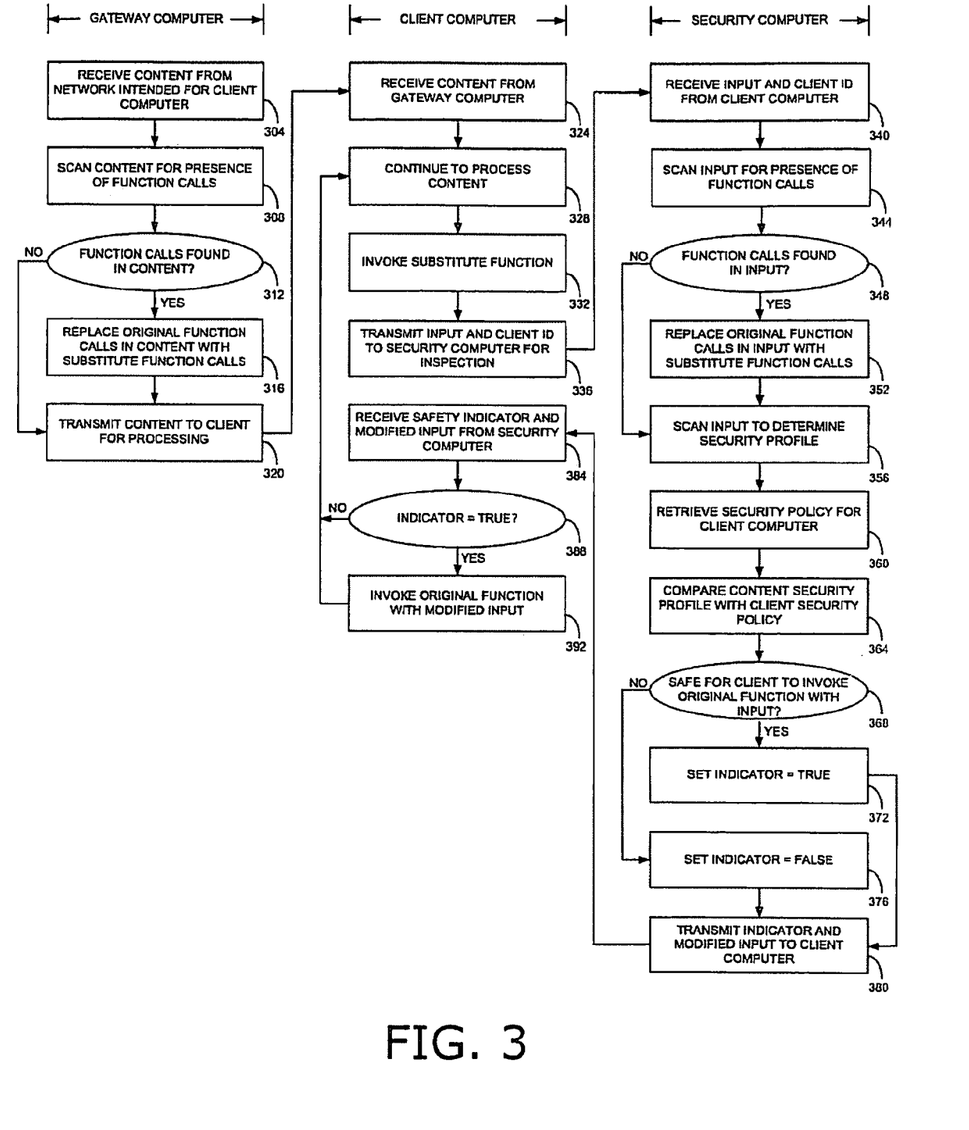
FIG. 3 is a simplified flowchart of a method for protecting a computer from dynamically generated malicious executable code, in accordance with a preferred embodiment of the present invention.

Reference is now made to FIG. 3, which is a simplified flowchart of a method for protecting a computer from dynamically generated malicious executable code, in accordance with a preferred embodiment of the present invention. The leftmost column of FIG. 3 shows steps performed by a gateway computer, such as gateway computer 205. The middle column of FIG. 3 shows steps performed by a client computer, such as client computer 210. The rightmost column of FIG. 3 shows steps performed by a security computer, such as security computer 215.

At step 304, the gateway computer receives content from a network, the content on its way for delivery to the client computer. Such content may be in the form of an HTML web page, an XML document, a Java applet, an EXE file, JavaScript, VBScript, an ActiveX Control, or any such data container that can be rendered by a client web browser. At step 308, the gateway computer scans the content it received, for the presence of function calls. At step 312, the gateway computer branches, depending on whether or not function calls were detected at step 308. If function calls were detected, then at step 316 the gateway computer replaces original function calls with substitute function calls within the content, thereby modifying the content. If function calls were not detected, then the gateway computer skips step 316. At step 320, the gateway computer sends the content, which may have been modified at step 316, to the client computer.

At step 324 the client computer receives the content, as modified by the gateway computer. At step 328 the client computer begins to continuously process the modified content; i.e., the client computer runs an application, such as a web browser or a Java virtual machine, that processes the modified content. At step 332, while processing the modified content, the client computer encounters a call (2) to a substitute function, such as the substitute function listed in TABLE I. Client computer then transmits the input to the substitute function and an identity of the client computer, to the security computer for inspection, at step 336. The identity of the client computer serves to inform the security computer where to return its inspection result. Since one security computer typically services many client computers, passing client computer identities is a way to direct the security computer where to send back its results. At this point, client computer suspends processing the modified content pending receipt of the inspection results from the security computer. As mentioned hereinabove, the client computer may also send the name of the original function to the security computer, for consideration in the inspection analysis.

At step 340 the security computer receives the input and client computer identifier. At step 344 the security computer scans the input for the presence of function calls. At step 348 the security computer branches, depending on whether or not function calls were detected at step 344. If function call were detected, then the security computer replaces original function calls with substitute function calls at step 352, thereby modifying the input. The security computer may insert definitions of the substitute functions into the input, as indicated in TABLE III, or may insert links to such definitions. Otherwise, the security computer skips step 352. Steps 344, 348 and 352 are similar to respective steps 308, 312 and 316 performed by the gateway computer.

At step 356 the security computer scans the input, which may have been modified at step 352, for the presence of potentially malicious operations. Preferably, the security computer determines a security profile for the input, which corresponds to a list of the potentially malicious operations that are detected.

At step 360 the security computer retrieves a security policy that governs the client computer. The security policy may be retrieved from a database that stores a plurality of security policies, each policy configurable by an administrator of client computers. Security policies may be set at a fine granularity of a policy for each client computer, or at a coarser granularity of a policy that applies to an entire department or workgroup.

At step 364 the security computer compares the security profile of the input under inspection with the security policy of the client computer, to determine if it is permissible for the client computer to invoke an original function with the input. Such determination may involve one or more simple or complex logical tests, structured in series or in parallel, or both, as described in assignee's U.S. Pat. No. 6,092,194.

At step 368 the security computer branches depending on the result of the comparison step 364. If the comparison step determines that the input is safe; i.e., that the input's security profile does not violate the client computer's security policy, then at step 372 the security computer sets an indicator of inspection results to true. Otherwise, at step 376 the security computer sets the indicator to false. At step 380 the security computer returns the indicator to the client computer. In addition, if the security computer modified the input at step 352, then it also returns the modified input to the client computer.

At step 384 the client computer receives the indicator and the modified input from the security computer and resumes processing the modified content, which had been suspended after step 336 as described hereinabove. At step 388 the client computer branches depending on the value of the indicator it received from the security computer. If the indicator is true, indicating that it is safe for the client computer to invoke the original function call (1), then the client computer invokes the original function using the modified input it received from the security computer, at step 392. Otherwise, the client computer does not invoke the original function, since the indicator indicates that such invocation may be malicious to the client computer. The client computer then loops back to step 328 to continue processing the modified content.

As described hereinabove, steps 344, 348 and 352, which modify the input, are useful in protecting against malicious code that is dynamically generated in a recursive manner, as in function call (5). The security computer may require multiple passes to detect such malicious code, and steps 344, 348 and 352 provide the mechanism for this to happen.

Reference is now made to FIG. 4, which is a simplified block diagram of a system for protecting a computer from dynamically generated malicious executable code, in which the gateway computer itself performs the code inspection, in accordance with a preferred embodiment of the present invention. The system illustrated in FIG. 4 is similar to the system of FIG. 2, where the functionality of the security computer has been incorporated into the gateway computer. The elements in FIG. 4 are thus similar in functionality to the elements in FIG. 2.

Two major components of the system, gateway computer 405 and client computer 410 communicate back and forth over communication channel 425. Gateway computer 405 includes a gateway receiver 435 and a gateway transmitter 440; and client computer 410 includes a client receiver 445 and a client transmitter 450. Although FIG. 4 includes only one client computer, this is solely for the purpose of clarity of exposition, and it is anticipated that gateway computer 405 serves many client computers 410.

Gateway computer 405 receives content, such as web content, from a network, over communication channel 420. Client computer 410 includes a content processor 470, such as a web browser, which processes content received from the network.

In accordance with a preferred embodiment of the present invention, gateway computer 405 includes an input inspector 475, and a content modifier 465 which also serves as an input modifier. That is, content modifier 465 incorporates the functionalities of content modifier 265 and input modifier 285 from FIG. 2. In addition, gateway computer 405 includes a database 480 of security policies, or else has access to such a database. The operations of input inspector 475 and content/input modifier 465 are similar to the operations of the corresponding elements in FIG. 2, as described hereinabove.

Incoming content received at gateway computer 405 passes through content modifier 465, which replaces function calls of the form (1) with substitute function calls of the form (2), and the modified content is transmitted to client computer 410. Content processor 470 processes the modified content and, while processing the modified content, if it encounters a substitute function call it sends the function's input to inspector 475 for inspection, and suspends processing of the modified content. The input passes through input modifier 465, and input inspector 475 analyzes the modified input for the presence of potentially malicious operations. Gateway computer 405 returns the input inspection results to client computer 410. Gateway computer 405 may also return the modified input to client computer 410. After receiving the inspection results, client computer 410 resumes processing the modified content and invokes or does not invoke the original function call, based on the inspection results.

Figure 5:
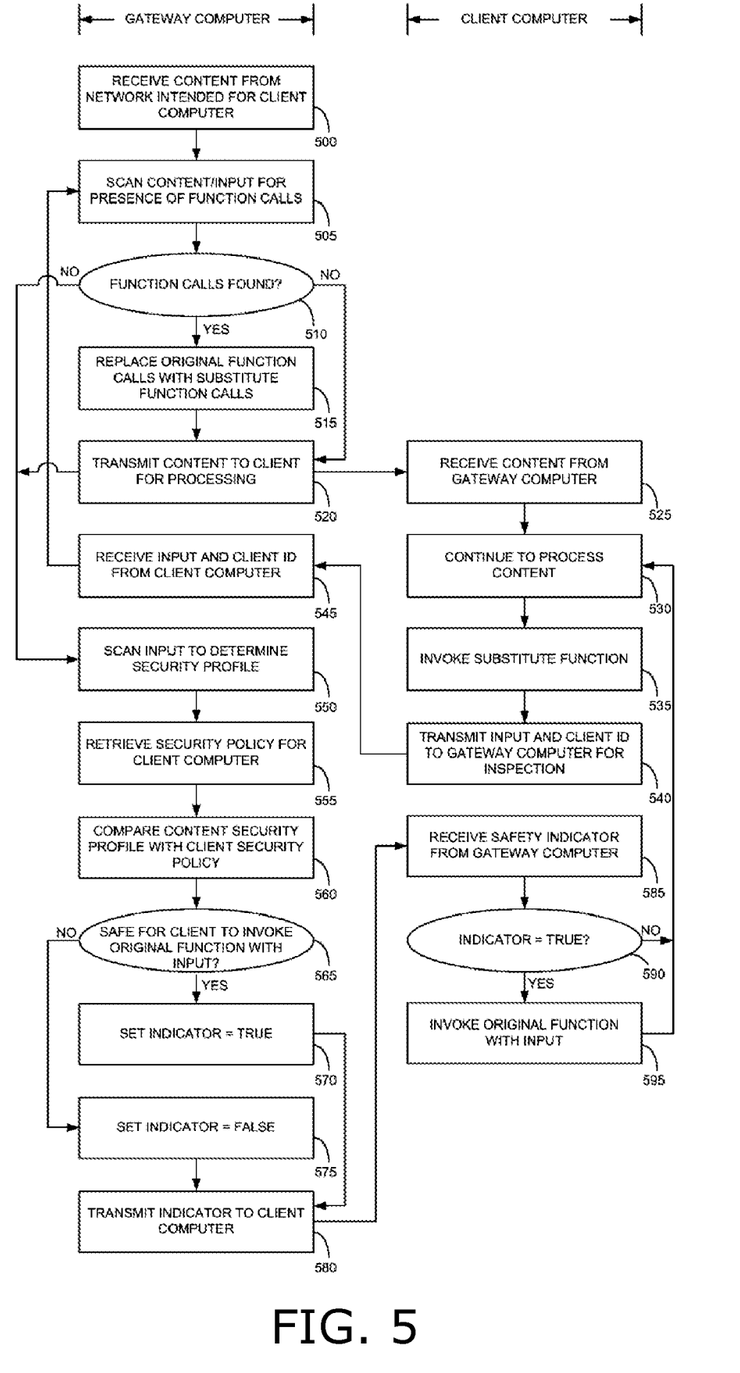
FIG. 5 is a simplified flowchart of a method for protecting a computer from dynamically generated malicious executable code, whereby the gateway computer itself performs the code inspection, in accordance with a preferred embodiment of the present invention.

Reference is now made to FIG. 5, which is a simplified flowchart of a method for protecting a computer from dynamically generated malicious executable code, whereby the gateway computer itself performs the code inspection, in accordance with a preferred embodiment of the present invention. The leftmost column indicates steps performed by a gateway computer, such as gateway computer 405; and the rightmost column indicates steps performed by a client computer, such as client computer 410.

The method illustrated in FIG. 5 is similar to that of FIG. 3, where steps 340-380 performed by the security computer in FIG. 3 are performed by the gateway computer in FIG. 5. At step 500 the gateway computer receives content from a network, the content intended for delivery to the client computer. At step 505 the gateway computer scans the content for the presence of function calls. At step 510 the gateway computer branches. If function calls within the content were detected at step 505, then at step 515 the gateway computer modifies the content by replacing original function calls of the form (1) with corresponding substitute function calls of the form (2). Otherwise, if function calls were not detected at step 505, then the gateway computer skips step 515. At step 520 the gateway computer transmits the content, which may have been modified at step 515, to the client computer.

At step 525 the client computer receives the content from the gateway computer, and at step 530 the client computer begins processing the content. While processing the content, the client computer invokes a substitute function call of the form (2) at step 535. The substitute function, being of the form listed on TABLE I, instructs the client computer to transmit the function input and a client computer identifier to the gateway computer for inspection. At step 540 the client computer transmits the input and the identifier to the gateway computer, and suspends processing of the content pending a reply from the gateway computer.

At step 545 the gateway computer receives the input and the client identifier from the client computer, and loops back to step 505 to scan the input for the presence of function calls. At step 510 the gateway computer branches. If function calls within the input were detected at step 505, then the gateway computer modifies the input at step 515, by replacing function calls of the form (1) with corresponding function calls of the form (2). Otherwise, if function calls were not detected at step 505, then the gateway computer skips step 515.

The gateway computer then proceeds to step 550, and scans the input, which may have been modified at step 515, to identify potentially malicious operations within the input. The potentially malicious operations identified form a security profile for the input.

At step 555 the gateway computer retrieves a security policy for the client computer from a database of security policies. At step 560 the gateway computer compares the input's security profile with the client computer's security policy to determine whether or not the security profile violates the security policy. At step 565 the gateway computer branches. If the results of step 560 indicate that the input security profile does not violate the client computer security policy, then it is safe for the client to invoke the original function call, and an indicator of the inspection results is set to true at step 570. Otherwise, the indicator is set to false at step 575. At step 580 the gateway computer returns the indicator to the client computer. The gateway computer may also return the modified input, as modified at step 515, to the client computer.

At step 585 the client computer receives the reply back from the gateway computer and resumes processing of the content, which processing had been suspended after step 540. At step 590 the client computer branches. If the indicator was set to true by the gateway computer at step 570, then the client computer invokes the original function call (1). If the gateway computer had modified the input at step 515, then preferably the client computer uses the modified input instead of the original input when invoking the original function call. Otherwise, if the indicator was set to false by the gateway computer at step 575, then the client computer skips step 595. The client computer then loops back to step 530 to continue processing of the content.

Having read the above disclosure, it will be appreciated by those skilled in the art that the present invention can be used to provide protection to computers against both statically and dynamically generated malicious code. Moreover, such protection may be afforded by a security computer that is remote from the computers being protected, thus adding another layer of security to methods and systems that embody the present invention.

In reading the above description, persons skilled in the art will realize that there are many apparent variations that can be applied to the methods and systems described. Thus it may be appreciated that the present invention applies to a variety of computing devices, including mobile devices with wireless Internet connections such as laptops, PDAs and cell phones.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method for protecting a computer from dynamically generated malicious content, comprising:
receiving at a gateway computer content being sent to a client computer for processing, the content including a call to an original function, and the call including an input;
modifying the content at the gateway computer, comprising replacing the call to the original function with a corresponding call to a substitute function, the substitute function being operational to send the input to a security computer for inspection;
transmitting the modified content from the gateway computer to the client computer;
processing the modified content at the client computer;
transmitting the input to the security computer for inspection when the substitute function is invoked;
modifying the input at the security computer if the input itself includes a call to a second original function with a second input by replacing the call to the second original function with a corresponding call to a second substitute function, the second substitute function being operational to send the second input to the security computer for inspections;
determining at the security computer whether it is safe for the client computer to invoke the original function;
transmitting the modified input from the security computer to the client computer, if the input was modified;
transmitting an indicator of whether it is safe for the client computer to invoke the original function, from the security computer to the client computer; and
invoking the original function at the client computer, only if the indicator received from the security computer indicates that such invocation is safe.

2. The method of claim 1 wherein said modifying the content further comprises inserting a definition of the substitute function into the content.

3. The method of claim 1 wherein said modifying the content further comprises inserting a link to a definition of the substitute function into the content.

4. The method of claim 1 wherein the gateway computer is the same computer as the security computer.

5. The method of claim 1 wherein the gateway computer is a different computer than the security computer.

6. The method of claim 1 further comprising transmitting an ID of the client computer to the security computer, and wherein said transmitting an indicator uses the ID of the client computer to direct the transmission to the client computer.

7. The method of claim 1 further comprising:
suspending processing of the modified content by the client computer after said transmitting the input to the security computer; and
resuming processing of the modified content by the client computer after the client computer receives the indicator from the security computer.

8. The method of claim 1 further comprising recording information about the input in an event log when said determining determines that it is not safe for the client computer to invoke the original function.

9. The method of claim 1 wherein said determining further comprises:
scanning the input to derive a security profile thereof;
retrieving a security policy for the client computer; and
comparing the derived security profile with the retrieved security policy.

10. A system for protecting a computer from dynamically generated malicious content, comprising:
a gateway computer, comprising:
a gateway receiver for receiving content being sent to a client computer for processing, the content including a call to an original function, and the call including an input;
a content modifier for modifying the received content by replacing the call to the original function with a corresponding call to a substitute function, the substitute function being operational to send the input to a security computer for inspection; and a gateway transmitter for transmitting the modified content from the gateway computer to the client computer;

the security computer, comprising:

a security receiver for receiving the input from the client computer;

an input modifier for modifying the input if the input itself includes a call to a second original function with a second input by replacing the call to the second original function with a corresponding call to a second substitute function, the second substitute function being operational to send the second input to the security computer for inspections;

an input inspector for determining whether it is safe for the client computer to invoke the original function; and a security transmitter for transmitting the modified input to the client computer, if the input was modified by said input modifier, and for transmitting an indicator of the determining to the client computer; and a client computer communicating with said gateway computer and with said security computer, comprising:

a client receiver for receiving the modified content from said gateway computer, for receiving the modified input, if the input was modified by said input modifier, and for receiving the indicator from said security computer;

a content processor for processing the modified content, and for invoking the original function only if the indicator indicates that such invocation is safe; and a client transmitter for transmitting the input to said security computer for inspection, when the substitute function is invoked.

11. The system of claim 10 wherein said content modifier inserts a definition of the substitute function into the content.

12. The system of claim 10 wherein said content modifier inserts a link to a definition of the substitute function into the content.

13. The system of claim 10 wherein the gateway computer is the same computer as the security computer.

14. The system of claim 10 wherein the gateway computer is a different computer than the security computer.

15. The system of claim 10 wherein said client transmitter also transmits an ID of said client computer, and wherein said security transmitter uses the ID to direct its transmission to the client computer.

16. The system of claim 10 wherein said content processor (i) suspends processing of the modified content after said client transmitter transmits the input to said security computer, and (ii) resumes processing of the modified content after said client receiver receives the indicator from said security computer.

17. The system of claim 10 wherein said security computer further comprises an event logger for recording information about the input in an event log when said input inspector determines that it is not safe for said client computer to invoke the original function.

18. The system of claim 10 wherein said input inspector further comprises:

a content scanner for scanning the input to derive a security profile thereof;

a policy manager for obtaining a security policy for the client computer; and a profile evaluator for comparing the derived security profile with the obtained security policy.

19. A method for protecting a computer from dynamically generated malicious content, comprising:

receiving content being sent to the computer for processing, the content including a call to an original function, and the call including an input;

modifying the content, comprising replacing the call to the original function with a corresponding call to a substitute function, the substitute function being operational to send the input for inspection;

modifying the input if the input itself includes a call to a second original function with a second input by replacing the call to the second original function with a corresponding call to a second substitute function, the second substitute function being operational to send the second input to the security computer for inspections;

transmitting the modified content to the computer for processing; and transmitting the modified input to the computer, if the input was modified.

20. The method of claim 19 wherein said modifying the content further comprises inserting a definition of the substitute function into the content.

21. The method of claim 19 wherein said modifying the content further comprises inserting a link to a definition of the substitute function into the content.

22. A system for protecting a computer from dynamically generated malicious content, comprising:

a receiver for receiving content being sent to the computer for processing, the content including a call to an original function, and the call including an input;

a content modifier for modifying the received content by replacing the call to the original function with a corresponding call to a substitute function, the substitute function being operational to send the input for inspection;

an input modifier for modifying the input if the input itself includes a call to a second original function with a second input by replacing the call to the second original function with a corresponding call to a second substitute function, the second substitute function being operational to send the second input to the security computer for inspections;

a transmitter for transmitting the modified content and the modified input, if modified by said input modifier, to the computer.

23. The system of claim 22 wherein said content modifier inserts a definition of the substitute function into the content.

24. The system of claim 22 wherein said content modifier inserts a link to a definition of the substitute function into the content.

25. A method for protecting a computer from dynamically generated malicious content, comprising:

receiving content being sent to the computer for processing, the content including a call to an original function, and the call including an input;

modifying the content, comprising replacing the call to the original function with a corresponding call to a substitute function, the substitute function being operational to send the input for inspection;

transmitting the modified content to the computer for processing;

receiving the input from the computer;

modifying the input if the input itself includes a call to a second original function with a second input by replacing the call to the second original function with a corresponding call to a second substitute function, the second substitute function being operational to send the second input to the security computer for inspections;

determining whether it is safe for the computer to invoke the original function;

transmitting the modified input to the computer, if the input was modified; and transmitting to the computer an indicator of whether it is safe for the computer to invoke the original function.

26. The method of claim 25 wherein said modifying the content further comprises inserting a definition of the substitute function into the content.

27. The method of claim 25 wherein said modifying the content further comprises inserting a link to a definition of the substitute function into the content.

28. The method of claim 25 further comprising recording information about the input in an event log when said determining determines that it is not safe for the computer to invoke the original function.

29. The method of claim 25 wherein said determining further comprises:

scanning the input to derive a security profile thereof;

retrieving a security policy for the computer; and comparing the derived security profile with the retrieved security policy.

30. A system for protecting a computer from dynamically generated malicious content, comprising:

a receiver (i) for receiving content being sent to the computer for processing, the content including a call to an original function, and the call including an input, and (ii) for receiving the input from the computer;

a content modifier for modifying the received content by replacing the call to the original function with a corresponding call to a substitute function, the substitute function being operational to send the input for inspection;

an input modifier for modifying the input if the input itself includes a call to a second original function with a second input, by replacing the call to the second original function with a corresponding call to a second substitute function, the second substitute function being operational to send the second input for inspection;

an input inspector for determining whether it is safe for the computer to invoke the original function; and a transmitter (i) for transmitting the modified content to the computer, (ii) for transmitting the modified input to the computer, if the input was modified by said input modifier, and (iii) for transmitting an indicator of the determining to the computer.

31. The system of claim 30 wherein said content modifier inserts a definition of the substitute function into the content.

32. The system of claim 30 wherein said content modifier inserts a link to a definition of the substitute function into the content.

33. The system of claim 30 further comprising an event logger for recording information about the input in an event log when said input inspector determines that it is not safe for the computer to invoke the original function.

34. The system of claim 30 wherein said input inspector comprises:

a content scanner for scanning the input to derive a security profile thereof;

a policy manager for obtaining a security policy for the computer; and a profile evaluator for comparing the derived security profile with the obtained security policy.

35. A method for protecting a computer from dynamically generated malicious content, comprising:

receiving an input from the computer;

modifying the input if the input includes a call to an original function, the call having an input by replacing the call to the original function with a corresponding call to a substitute function, the substitute function being operational to send the input for inspections;

determining whether it is safe for the computer to invoke a function with the input;

transmitting the modified input to the computer, if the input was modified; and transmitting an indicator of said determining to the computer.

36. The method of claim 35 wherein said modifying the input further comprises inserting a definition of the substitute function into the input.

37. The method of claim 35 wherein said modifying the input further comprises inserting a link to a definition of the substitute function into the input.

38. The method of claim 35 further comprising receiving an ID of the computer, and wherein said transmitting an indicator uses the ID to direct the transmission to the computer.

39. The method of claim 35 further comprising recording information about the input in an event log when said determining determines that it is not safe for the computer to invoke a function with the input.

40. The method of claim 35 wherein said determining further comprises:

scanning the input to derive a security profile thereof;

retrieving a security policy for the computer; and comparing the derived security profile with the retrieved security policy.

41. A system for protecting a computer from dynamically generated malicious content, comprising:

a receiver for receiving an input from the computer;

an input modifier for modifying the input if the input includes a call to an original function, the call having an input, by replacing the call to the original function with a corresponding call to a substitute function, the substitute function being operational to send the input for inspection;

an input inspector for determining whether it is safe for the computer to invoke a function with the input; and a transmitter for transmitting the modified input, if modified by said input modifier, and an indicator of the determining to the computer.

42. The system of claim 41 wherein said input modifier inserts a definition of the substitute function into the input.

43. The system of claim 41 wherein said input modifier inserts a link to a definition of the substitute function into the input.

44. The system of claim 41 wherein said receiver also receives an ID of the computer, and wherein said transmitter uses the ID to direct its transmission to the computer.

45. The system of claim 41 further comprising an event logger for recording information about the input in an event log when said input inspector determines that it is not safe for the computer to invoke a function with the input.

46. The system of claim 41 wherein said input inspector further comprises:

a content scanner for scanning the input to derive a security profile thereof;

a policy manager for obtaining a security policy for the computer; and a profile evaluator for comparing the derived security profile with the obtained security policy.

* * * * *